United States Patent [19]

Lodge

[11] 4,141,252

[45] Feb. 27, 1979

[54] FLUSH PRESSURE TRANSDUCERS FOR MEASURING PRESSURES IN A FLOWING FLUID

[76] Inventor: Arthur S. Lodge, 210 DuRose Terrace, Madison, Wis. 53705

[21] Appl. No.: 848,516

[22] Filed: Nov. 4, 1977

[51] Int. Cl.² ............................................. G01L 9/12
[52] U.S. Cl. ....................................... 73/724; 73/730
[58] Field of Search ............... 73/730, 724, 718, 701, 73/205 R; 361/283

[56] References Cited

U.S. PATENT DOCUMENTS

| | | | |
|---|---|---|---|
| 3,027,769 | 4/1962 | Coon | 73/724 |
| 3,142,988 | 8/1964 | Love | 73/730 |
| 3,880,008 | 4/1975 | Eilersen | 73/730 |
| 3,939,708 | 2/1976 | Greer et al. | 73/205 R |

*Primary Examiner*—Donald O. Woodiel
*Attorney, Agent, or Firm*—Burmeister, York, Palmatier, Hamby & Jones

[57] ABSTRACT

The pressure of a fluid, flowing along a passage, is accurately measured by a flush pressure transducer, including substantially flat diaphragm means forming a smooth continuous wall of the passage, a body backing up and supporting the diaphragm means, the body having an opening therein, the diaphragm means covering such opening and affording a flexible resilient diaphragm across such opening, and sensor means operable by the diaphragm for sensing any deflection of the diaphragm due to any fluid pressure against the diaphragm. The diaphragm means may comprise a substantially flat sheet mounted against the body and extending across the opening, preferably with bonding means between such sheet and the body. Alternatively, the diaphragm means may be integral with the body. A temperature sensor may be mounted behind the diaphragm means and in a second opening in the body. The pressure sensor may afford a variable capacitance between capacitor electrodes in the first mentioned opening and on the diaphragm. Fluid pressure may be supplied to the diaphragm within the opening for counterbalancing the pressure of the fluid in the passage. The flush stepless pressure transducer makes it possible to measure the pressure of the flowing fluid with increased accuracy, without any disturbances due to irregularities or steps attributable to the transducer.

14 Claims, 18 Drawing Figures

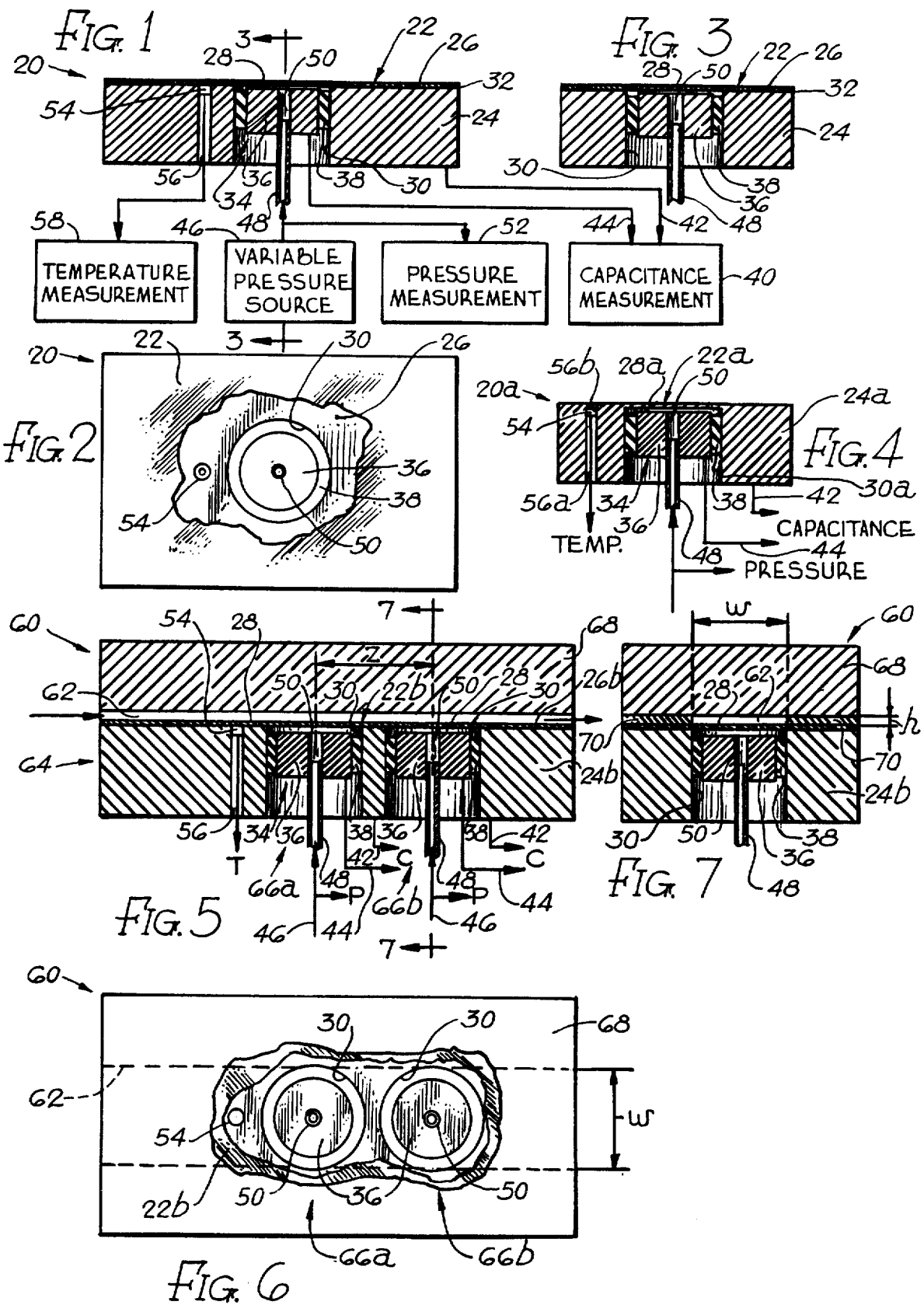

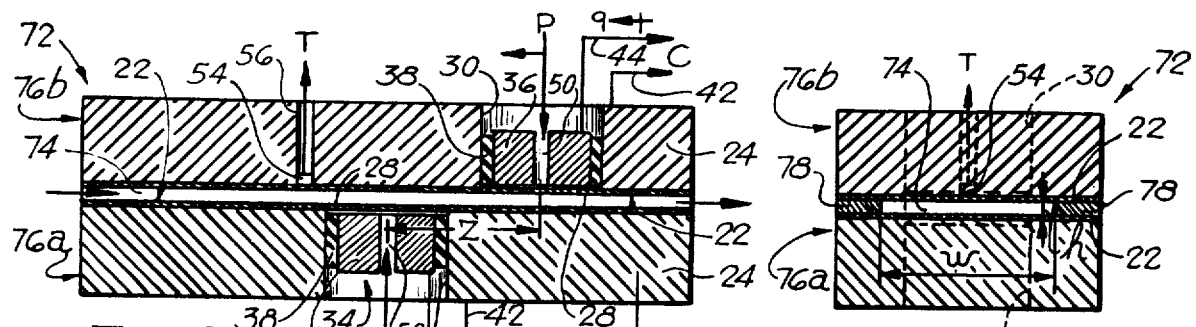
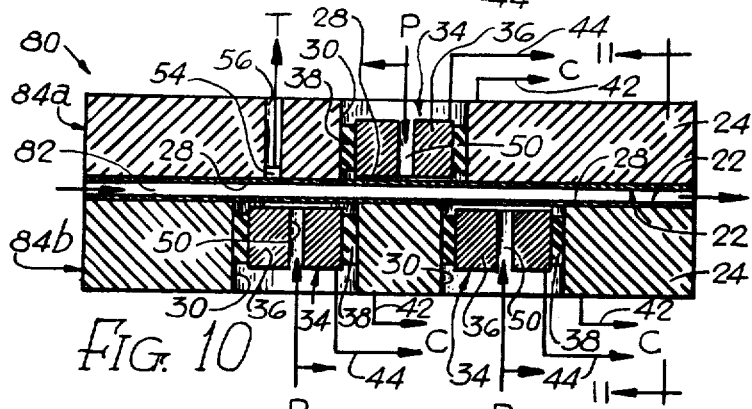
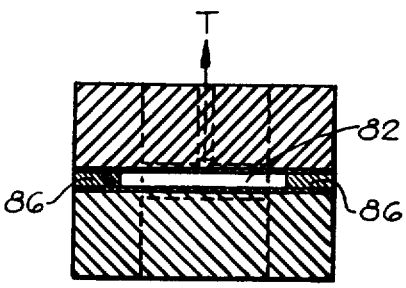
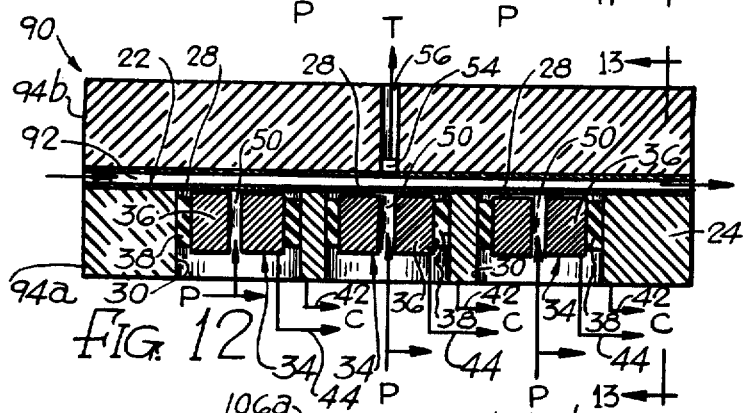
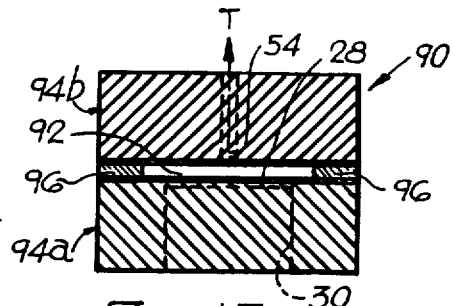
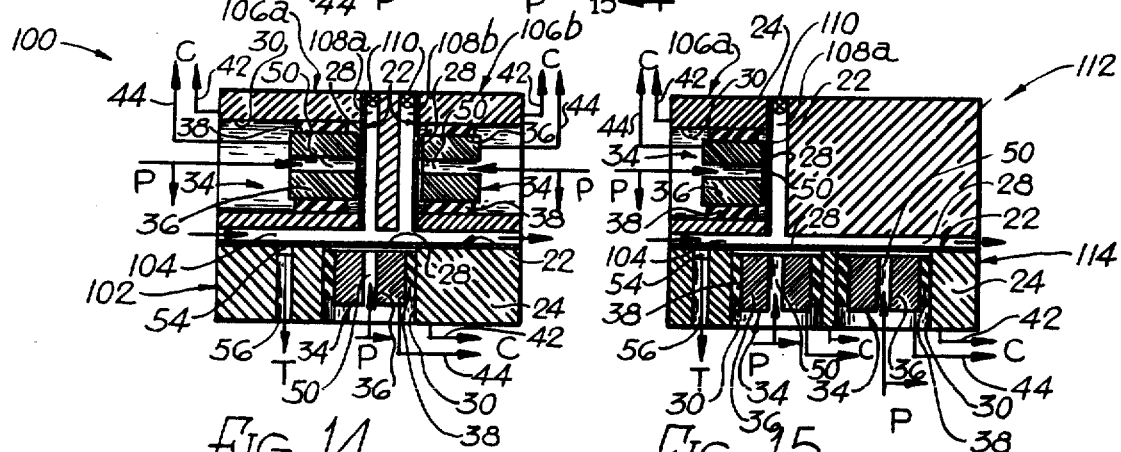

AMOCO POLYBUTENE L100 AT 23.7°C

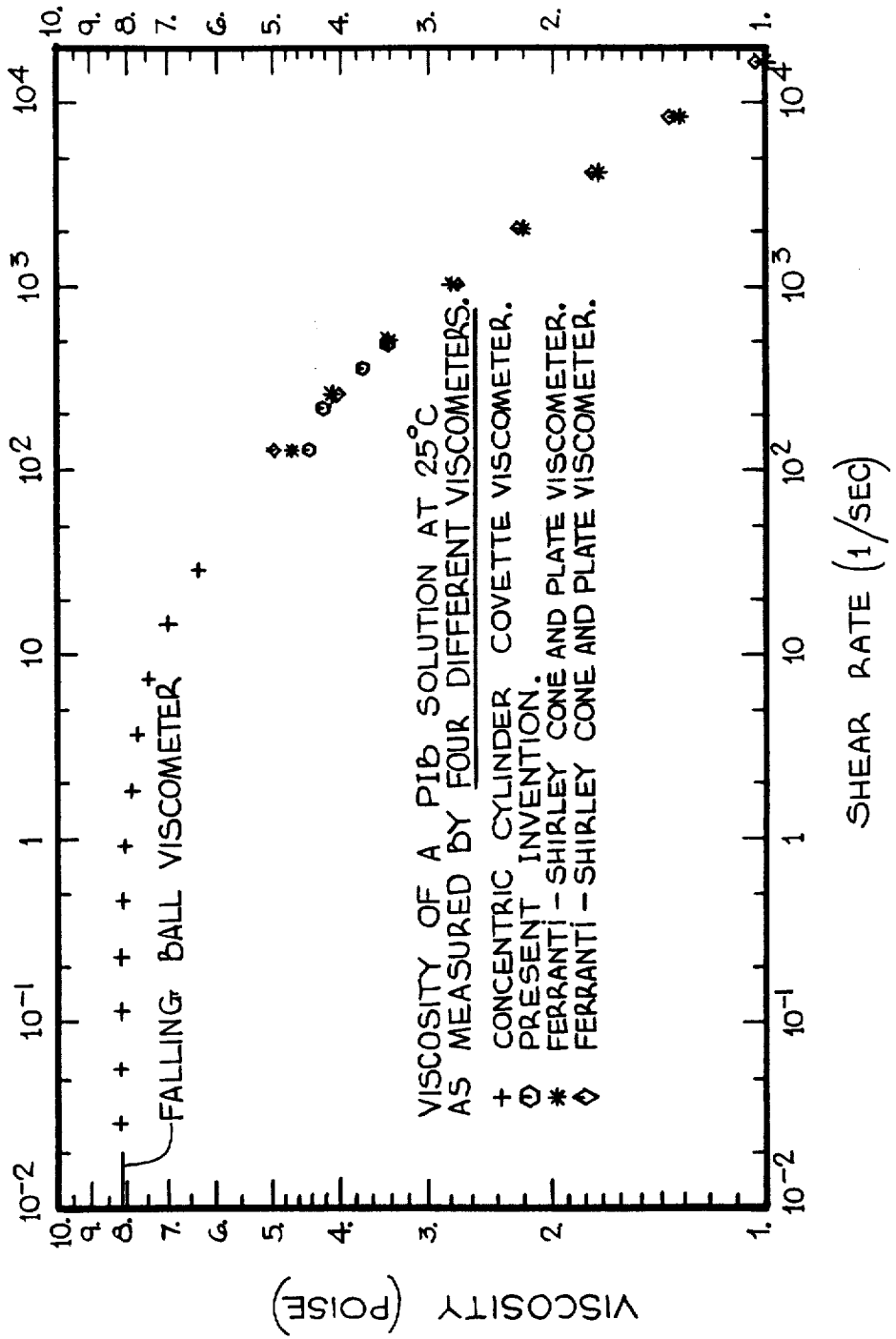

FLUSH PRESSURE TRANSDUCERS FOR MEASURING PRESSURES IN A FLOWING FLUID

This invention relates to flush pressure transducers for accurately measuring pressures in a flowing fluid.

One object of the present invention is to provide a new and improved flush pressure transducer for measuring the pressure of a flowing fluid with increased accuracy.

A further object is to provide a new and improved flush transducer which does not produce any steps or other irregularities in the wall of the passage along which the fluid to be measured is flowing.

Another object is to provide a new and improved flush pressure transducer which may incorporate one or more pressure sensors, and also one or more temperature sensors.

These and other objects of the present invention may be accomplished by providing a pressure measuring device, including substantially flat diaphragm means forming one substantially complete wall of a passage along which the fluid may flow, a body backing up and supporting the diaphragm means, the body having an opening behind the diaphragm means, the diaphragm means covering such opening and affording a flexible resilient diaphragm extending across the opening, and sensor means for sensing any deflection of the diaphragm due to any fluid pressure in the passage.

The diaphragm means may advantageously comprise a substantially flat sheet mounted against the body and extending across the opening. Bonding means may be provided between the sheet and the body for bonding the sheet to the body.

Alternatively, the diaphragm means may be integral with the body.

There may be a plurality of openings in the body, forming a plurality of diaphragms. A plurality of pressure sensors may be operable by such diaphragms.

The body may also have one or more additional openings with one or more temperature sensors therein, adjacent the diaphragm means, for sensing the temperature of the fluid.

The pressure sensor may afford a variable capacitance, between capacitor electrodes on the diaphragm and in the opening behind the diaphragm.

Fluid pressure may be supplied to the opening behind the diaphragm, to counterbalance applied fluid pressure on the diaphragm. The flush, stepless pressure transducer of the present invention is capable of measuring pressures in flowing fluids with increased accuracy, particularly as to fluids which are highly viscous or non-newtonian.

Further objects, advantages and features of the present invention will appear from the following description, taken with the accompanying drawings, in which:

FIG. 1 is a diagrammatic longitudinal section of a flush pressure transducer to be described as an illustrative embodiment of the present invention.

FIG. 2 is a plan view of the flush pressure transducer with a portion of the diaphragm means broken away.

FIG. 3 is a transverse section taken generally along the line 3—3 in FIG. 1.

FIG. 4 is a diagrammatic longitudinal section, similar to FIG. 1, but showing a modified flush pressure transducer.

FIG. 5 is a diagrammatic longitudinal section showing a more elaborate pressure measuring device having two flush pressure transducers and a temperature sensor along one continuous wall of a fluid passage.

FIG. 6 is a plan view of the device shown in FIG. 5, with portions of the passage wall and diaphragm means broken away.

FIG. 7 is a transverse section, taken generally along the line 7—7 in FIG. 5.

FIG. 8 is a diagrammatic longitudinal section showing a modified pressure measuring device having two flush pressure transducers on opposite sides of the fluid passage.

FIG. 9 is a diagrammatic transverse section, taken generally along the line 9—9 in FIG. 8.

FIG. 10 is a diagrammatic longitudinal section showing a modified pressure measuring device having three flush pressure transducers along the opposite sides of the fluid passage.

FIG. 11 is a diagrammatic transverse section taken generally along the line 11—11 in FIG. 10.

FIG. 12 is a diagrammatic longitudinal section showing another pressure measuring device having three flush pressure transducers along one wall of the fluid passage.

FIG. 13 is a diagrammatic transverse section, taken generally along the line 13—13 in FIG. 12.

FIG. 14 is a diagrammatic longitudinal section, showing a pressure measuring device including one flush pressure transducer along one passage wall, and two additional transducers for measuring hole pressures.

FIG. 15 is a diagrammatic longitudinal section of a pressure measuring device including two flush pressure transducers along one passage wall, and an additional transducer for measuring a hole pressure.

FIG. 18 is a graph representing viscosity measurements.

Figure 16:
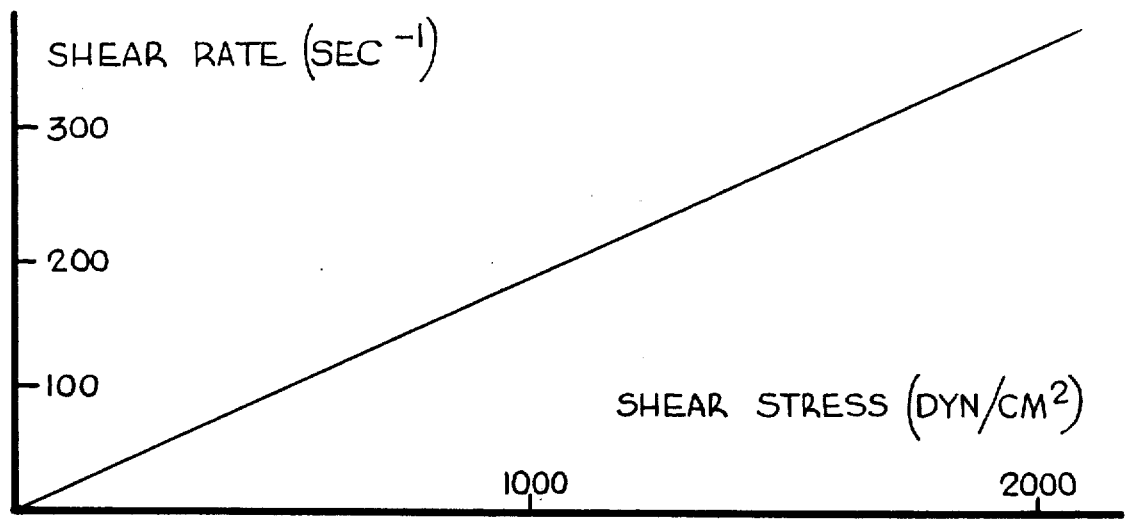
FIG. 16 is a graph showing the relationship between shear stress and shear rate in a flowing fluid.

As just indicated, FIGS. 1–3 illustrate a flush pressure transducer 20, constituting an illustrative embodiment of the present invention. The flush pressure transducer 20 comprises substantially flat diaphragm means 22, backed up and supported by a body or block 24. One complete wall or surface 26 of the body 24 is covered by the diaphragm means 22, which is continuous, smooth and uninterrupted. The diaphragm means 22 forms a thin, flexible and resilient diaphragm 28, extending across and covering an opening 30 in the body 24. The diaphragm 28 is adapted to be deflected by any pressure differential between the opposite sides of the diaphragm.

In the flush pressure transducer 20 of FIGS. 1–3, the diaphragm means 22 is in the form of a thin flat sheet, preferably made of metal foil, stretched along and mounted against the flat wall or surface 26 of the body 24. The sheet or foil 22 is preferably bonded to the surface 26 of the body 24 by a thin layer or film 32 of a bonding material, which may be made of a metallic composition, such as solder, for example, or of a resinous plastic material, such as epoxy, or any other suitable bonding means. The diaphragm sheet 22 and the body 24 are preferably made of metal but may also be made of resinous plastic materials, or other suitable materials.

The pressure transducer 20 comprises a pressure sensor 34 for sensing any fluid pressure applied to the diaphragm 28. Such pressure tends to produce deflection of the diaphragm 28. In the illustrative construction of FIGS. 1-3, the pressure sensor 34 provides a variable capacitance between a first capacitor electrode 36 and a second capacitor electrode on the diaphragm 28. In the preferred construction, the diaphragm sheet or foil 22 is made of metal and is electrically conductive, so that the diaphragm 28 advantageously constitutes the second capacitor electrode. The first capacitor electrode 36 is preferably mounted in the opening 30, as by means of a ring-shaped electrical insulator 38. The electrode 36 is shown as a solid cylindrical slug made of metal or some other suitable electrically conductive material.

Any fluid pressure on the diaphragm 28 tends to deflect the diaphragm, so as to change the spacing between the diaphragm 28 and the capacitor electrode 36. Thus, the electrical capacitance between the diaphragm 28 and the electrode 36 is varied. Thus, the electrical capacitance may be measured to provide a measurement of the fluid pressure. A capacitance measurement device or means 40 is connected to the diaphragm 28 and the capacitor electrode 36 by respetive leads 42 and 44. For convenience, the lead 42 may be connected to the body 24, when, as shown, the body 24 is made of an electrically conductive material and is in electrical contact with the diaphragm sheet 22, which is also made of metal or some other suitable electrically conductive material.

The capacitance measurement means 40 of FIG. 1 may be calibrated in terms of the fluid pressure applied to the outer side of the diaphragm 28, but it is often more advantageous to supply a counterbalancing fluid pressure to the opposite side of the diaphragm 28 within the opening 30. Such counterbalancing pressure may be supplied by a variable pressure source 46, connected to the opening 30 above the electrode 36 by a tube 48 communicating with an opening 50 which extends through the electrode 36.

With the arrangement of FIG. 1, the variable pressure source 46 is adjusted to supply a counterbalancing pressure which nullifies any change in the electrical capacitance between the diaphragm 28 and the electrode 36, as indicated by the capacitance measurement device 40. The pressure developed by the variable pressure source 46 is then measured by a pressure measurement device or means 52, which may be in the form of any suitable pressure gauge or the like.

The pressure transducer 20 of FIGS. 1-3 may also be advantageously provided with a temperature sensor 54, mounted in an additional opening 56 in the body. The diaphragm sheet or means 22 extend across and closes the temperature sensor opening 56. The temperature sensor 54 is preferably in engagement with or closely adjacent the diaphragm means 26, so as to provide an accurate measurement of the temperature of the fluid on the outer side of the diaphragm means 22. The temperature sensor 54 is shown diagrammatically in FIG. 1 and may be of any suitable type, such as a thermocouple or thermistor, connected to a temperature measurement device or means 58.

The pressure transducer construction of FIGS. 1-3 provides a pressure transducer which is truly flush, to a high degree of precision. The smooth continuous uninterrupted diaphragm means 22, which is coextensive with the flat supporting surface 26 of the body 24, provides a flush pressure transducer which is completely stepless and free from gaps, breaks, discontinuities and irregularities of all kinds, which might otherwise cause inaccuracy in the measurement of the fluid pressure, particularly in environments in which the fluid is flowing along the wall in which the pressure transducer is mounted. In the prior art, it was the typical practice to simply insert a separate flush-mounted pressure transducer in a hole in the wall of an apparatus. This construction can result in a small gap between the apparatus wall and the transducer, through which gap the test liquid or fluid can seep or leak. Moreover, it is in practice difficult or virtually impossible to achieve complete accuracy in positioning the separate transducer so that its face is truly flush with the rest of the apparatus wall. Even if great care is taken, the step or distance between the transducer plane and the apparatus wall can easily be 0.001 inch or even 0.002 inch. A step of even this small magnitude can cause a substantial disturbance to the state of flow of a test liquid, particularly when the apparatus wall is closely spaced from the opposite apparatus wall, at a distance or slit height of only about 0.02 inch, for example, as is the case in certain applications of practical importance. An unwanted step of only 0.002 inch can thus constitute a change of 10 percent in the slit height and can produce a change of 20 percent in the wall shear rate.

The new flush pressure transducer of the present invention overcomes these difficulties in a dramatic way. The flush pressure transducer of the present invention provides continuous diaphragm means, constituting a wall which is flat to within 0.0001 inch, or less, overall. For a slit height of 0.02 inch, the variation in the slit height is thus reduced to 0.5%. This is better by a factor of 20 than the typical variation experienced in the prior art, and 40 times better in regard to the uniformity of the wall shear rate.

In the flush pressure transducer 20 of FIG. 1, the provision of the diaphragm means 22 as a separate sheet or foil, mounted on the body 24, is highly advantageous, because this arrangement greatly facilitates the construction of the flush pressure transducer. However, alternatively, the diaphragm means can be integral with the supporting body.

This alternative construction is shown in FIG. 4, which illustrates a modified flush pressure transducer 20a, including diaphragm means 22a which is integral with the supporting body 24a. The integral diaphragm means 22a forms a flexible resilient diaphragm 28a, extending across and closing a hole or opening 30a in the body 24a. The opening 30a is formed in such a manner as to produce the thin flexible diaphragm 28a. For example, the opening 30a may be machined, molded or cast into the body 24a, or a combination of such operations may be employed. Quite evidently, it is a matter of some difficulty to form the opening 30a with the precision which is required to produce the thin flexible diaphragm 28a, in one piece with the body 24a.

In the modified flush pressure transducer 20a of FIG. 4, the temperature sensor 54 is mounted in a hole or opening 56a which does not quite extend entirely through the body 24a, so as to leave a thin integral diaphragm element 56b to close and cover the opening 56a.

Thus, in the construction of FIG. 4, the diaphragm means 22a is formed in one piece with the supporting body 24a, to produce the thin flexible diaphragm 28a and the thin diaphragm element 56b. It is generally more advantageous to provide the diaphragm means as a separate sheet or foil 22, as in the flush pressure transducer 20 of FIGS. 1-3.

Except as specifically described above, the embodiment of FIG. 4 may be the same as the embodiment of FIGS. 1—3.

FIGS. 5-15 illustrate several applications of the present invention, involving flush pressure transducers in various arrangements.

FIGS. 5-7 illustrate a measuring device 60 for measuring the pressure and the temperature of a liquid or fluid, flowing along a passage or slit 62. One complete wall of the passage or slit 62 is formed by a flush pressure transducer 64, which incorporates all of the components of the flush pressure transducer 20, already described in connection with FIGS. 1-3, plus additional pressure transducer components, so that the pressure transducer 64 includes two complete pressure transducer elements 66a and b, for measuring the pressure of the flowing liquid at spaced points along the passage or slit 62. Thus, the pressure transducer 64 comprises a single diaphragm means 22b, preferably in the form of a thin sheet or foil, mounted against a flat supporting surface 26b of a body or block 24b. The diaphragm sheet or foil 22b provides two of the diaphragms 28, stretched across and closing two of the openings 30 in the body 24b. A separate capacitor electrode 36 is preferably mounted in each of the openings 30, to form two separate pressure sensors 34, which are the same as described in connection with FIGS. 1-3.

The pressure transducer 64 of FIGS. 5-7 includes a single temperature sensor 54 which is arranged in the same manner as described in connection with FIGS. 1-3. The two pressure transducer elements 66a and b are spaced apart along the fluid passage or slit 62 by a distance z, measured between centers.

One complete wall of the slit 62 is formed by the smooth continuous diaphragm sheet or foil 22b. The other walls of the passage or slit 62 are formed by a second body or block 68 and by a pair of spacers 70, which determine the height h and width w of the passage 62. The spacers 70 are disposed between the block 68 and the diaphragm sheet or foil 22b. The entire assembly is secured together in any suitable manner, as by clamps, fasteners or bonding agents. Except as described above, the construction of the pressure transducer 64 may be the same as described in connection with the pressure transducer 20 of FIGS. 1-3, or in connection with the modified transducer 20a of FIG. 4.

The measuring device of FIGS. 5-7 makes it possible to measure the pressures $P_1$ and $P_2$ at two spaced points, separated by the distance z, along the flowing liquid or fluid in the passage or slit 62. From the measured pressure values $P_1$ and $P_2$ it is possible to calculate the wall shear stress $\sigma$, by using the following formula:

$$\sigma = h(P_1 - P_2)/(2z)$$

In this formula, h is the height of the slit, and z is the distance in the direction of fluid flow between the points at which the pressure values $P_1$ and $P_2$ are measured. This formula presupposes that the pressure in the passage or slit 62 varies linearly along the passage in the direction of flow.

FIGS. 8 and 9 illustrate another modified measuring device 72, for measuring two separate pressure values $P_1$ and $P_2$ along a passage or slit 74 in which a liquid or other fluid is flowing. In this case, the passage or slit 74 is formed between two flush pressure transducers 76a and b, each of which is very similar to the flush pressure transducer 20 of FIG. 1. Thus, the flush pressure transducer 76a is esssentially the same as the flush pressure transducer 20, except for the omission of the temperature sensor 54 and its opening 56. The flush pressure transducer 76a is adapted to measure the pressure value $P_1$.

The flush pressure transducer 76b is essentially the same as the flush pressure transducer 20, except that the opening 30 in the body 24 is repositioned, so that the opening 30 is spaced along the slit or passage 74 from the opening 30 in the body of the flush pressure transducer 76a, by a distance z, measured along the direction of fluid flow. The flush pressure transducer 76b is also inverted in position.

The diaphragm sheets or foils 22 of the transducers 76a and b are spaced apart by spacers 78 which determine the height h and the width w of the passage or slit 74. The measuring device 72 may be secured together by any suitable means, such as clamps, fasteners or bonding agents. In the case of the measuring device 72, the wall shear stress $\sigma$ can be calculated from the measured pressure values $P_1$ and $P_2$ by using the same formula, as in the case of the measuring device 60 of FIGS. 5-7.

FIGS. 10 and 11 illustrate another modified measuring device 80, for measuring three separate pressure values $P_1$, $P_2$ and $P_3$ along a passage or slit 82 in which a liquid or other fluid is flowing. As before, the passage or slit 82 is formed between two flush pressure transducers 84a and b, each of which is similar to the flush pressure transducer 20 of FIG. 1. Thus, the flush pressure transducer 84a is esssentially the same as the flush pressure transducer 20, except for being inverted in position. The flush pressure transducer 84a is adapted to measure the second pressure value $P_2$, and also the temperature of the fluid in the passage or slit 82.

The flush pressure transducer 84b is the same as the flush pressure transducer 20, except that the diaphragm sheet or means 22 provides two diaphragms 28, extending across and closing two openings 30 in the body 24. Two separate pressure sensors 34 are provided for the two diaphragms 28. The flush pressure transducer 84b does not include a temperature sensor. The two pressure sensors 34 provide for measurement of the first and third pressure values $P_1$ and $P_3$.

Thus, the two flush pressure transducers 84a and 84b provide for the measurement of three separate pressure values $P_1$, $P_2$ and $P_3$ at three separate points, spaced along the fluid passage or slit 82, in the direction of fluid flow. While it is sufficient in principle to employ two pressure transducer elements to measure the pressure gradient along the fluid passage, as in the embodiments of FIGS. 5-9, it is desirable in practice to employ three or more transducer elements as a means of checking on the linearity of the relation between pressure and position along the axis of the passage or slit, as in the measuring device or die 80 of FIGS. 10 and 11.

The diaphragm sheets or foils 28 of the flush pressure transducers 84a and b are spaced apart by spacers 86 which determine the height h and the width w of the passage or slit 82. As before, the measuring device 80 may be secured together by any suitable means, such as clamps, fasteners or bonding means. The wall shear stress $\sigma$ can be calculated in the same manner as described in connection with FIGS. 5-7.

FIGS. 12 and 13 illustrate another modified measuring device 90 for measuring three separate pressure values $P_1$, $p_2$ and $P_3$ along a passage or slit 92 in which a liquid or other fluid is adapted to flow. As illustrated, the passage or slit 92 is formed between two flush transducer devices 94a and b. The transducer device 94a is similar to the flush pressure transducer 20 of FIG. 1, but is adapted to measure all three pressures $P_1$, $P_2$ and $P_3$. The transducer device 94b is adapted to measure the temperature of the fluid.

Thus, the flush transducer device 94a is the same as the flush pressure transducer 20 of FIG. 1, except that the diaphragm foil or means 22 of the transducer device 94a provides three of the diaphragms 28, extending across and closing three of the openings 30 in the body 24, such openings being spaced apart along the passage or slit 92 in the direction of fluid flow. The three diaphragms 28 are provided with three separate pressure sensors 34, each of which may be the same as described in connection with FIG. 1. The temperature sensor is omitted from the illustrated transducer device 94a.

However, the transducer device 94b includes only the temperature sensor 54, mounted in its opening 56, adajcent the diaphragm foil or means 22. The body 24 of the transducer device 94b does not have any pressure transducer opening 30. Otherwise, the transducer device 94b is the same as the transducer 20 of FIG. 1.

The diaphragm sheets or foils 22 of the transducer devices 94a and b are spaced apart by spacers 96 which determine the height h and the width w of the passage or slit 92. The measuring device 90 may be secured together by any suitable means, such as clamps, fasteners or bonding means. As before, the wall shear stress $\sigma$ can be calculated from the measured pressure values $P_1$, $P_2$ and $P_3$ by using the formula described in connection with FIGS. 5–7.

In the measuring devices 72, 80 and 90 of FIGS. 8–13, the smooth continuous diaphragm foils or means 22 form both of the two principal walls of the respective passages or slits 74, 82 and 92, so that these walls are stepless and free from any gap or irregularity which might disturb the flow of the liquid or other fluid along the passages. Thus, the fluid pressures can be measured with a high degree of precision. Moreover, there is no gap through which the liquid or fluid might possibly leak.

It is well known that the viscosity of test liquids varies very markedly with the temperature of such liquids. Thus, it is important to measure the temperature of the test liquid with a high degree of accuracy and in a location as close as possible to the place where the wall shear stress is being determined. The present invention provides a particularly easy and advantageous means for making such temperature measurements, in that the temperature sensor opening or hole 56 can be drilled or otherwise formed through the body or die 24, before the stretched diaphragm foil 22 is bonded to the body. The temperature sensor 54 can subsequently be inserted into the opening 56, with the sensitive end of the temperature sensor in engagement with or closely adjacent the inner surface of the foil 22. In this way, the temperature sensor is separated from the test liquid by only the foil thickness, which can be as small as 0.001 inch or 0.002 inch. It will be understood that the diaphragm foil thickness may be varied to suit various conditions, such as the magnitude of the fluid pressure, for example. With the construction of the present invention, a useful temperature measurement can thus be made without disturbing the state of the fluid flow along the passage or slit in the die. It would be much more difficult to achieve this employing prior art by drilling a hole in the die wall block and stopping the hole drilling within 0.001 inch of the surface.

It will be understood that any measuring device in accordance with the present invention may be provided with two or more temperature sensors 54 mounted in separate sensor openings or holes 56, drilled or otherwise formed in the die body or block 24, as needed or desired to check the temperature uniformity at various locations. For simplicity, each of the illustrated embodiments includes only one temperature sensor 54 mounted in a single sensor opening 56.

FIGS. 14 and 15 illustrate additional modified measuring devices for measuring not only the shear wall stress $\sigma$, but also hole pressure $P^*$, which is the difference between the flush pressure, at a particular location, along a wall, and the pressure in a hole in the wall at the same location. The measurement of such hole pressure is disclosed and claimed in the applicant's U.S. Pat. No. 3,777,549, issued Dec. 11, 1973, which is incorporated herein by reference. The hole pressure may be represented by the following formula:

$$P^* = P_1 P_2$$

In this formula, $P_1$ is the flush pressure, measured at a particular location along a wall with a first transducer which is flush mounted, while $P_2$ is the pressure measured at the same location, or at an equivalent location, with a second transducer which is hole-mounted. The hole pressure $P^*$ is now recognized as an important source of information, different from and complementary to the information furnished by the wall shear stress $\sigma$.

Thus, FIG. 14 illustrates a measuring device 100 including a flush pressure transducer 102 which is essentially the same as the flush pressure transducer 20 of FIG. 1. The flush pressure transducer 102 measures the flush pressure at a particular point along a passage or slit 104, along which a liquid or fluid is adapted to flow. The diaphragm foil or means 22 of the flush pressure transducer 102 provides a smooth, continuous, unbroken wall, on one complete side of the passage 104.

The measuring device 100 of FIG. 14 also includes two hole pressure transducers 106a and b, for measuring the pressures in two holes 108a and b, communicating with the passage or slit 104. The center of the first hole 108a is on a line which is perpendicular to the plane of the diaphragm foil or means 22 of the flush pressure transducer 102. Moreover, such line passes through the effective center of the flush pressure transducer diaphragm 28. Thus, the hole 108a is at a location which is equivalent to the location at which the flush pressure is measured by the transducer 102. Accordingly, any pressure differential constituting the hole pressure $P^*$, between the flush pressure and the holemeasured pressure, is due to the effect of the hole 108a.

The second hole 108b is spaced from the first hole 108a, along the passage or slit 104 in the direction of fluid flow.

The hole pressure transducers 106a and b are adapted to measure the pressures in the first and second holes 108a and b. Otherwise, the transducers 106a and b are structurally similar to the pressure transducer 20 of FIG. 1, except that the temperature sensor 54 is omitted in each case. The diaphragms 28 of the transducers 106a and b are exposed to the fluid pressures in the respective holes 108a and b. In FIG. 14, the components of the transducers 106a and b have been given the same reference characters as in FIG. 1. The blind ends of the holes 108a and b are closed by stop-cocks 110 which can be opened, as needed, to vent any air or extraneous liquid from the holes 108 a and b, so that the holes will be filled with the test liquid.

In FIG. 14, the passage or slit 104 is formed between the flush pressure transducer 102 and the hole pressure transducers 106a and b.

The difference between the flush pressure $P_1$, measured by the transducer 102, and the first hole pressure $P_2$, measured by the transducer 106a, constitutes the hole pressure $P^*$. The provision of the second hole transducer 106b makes it possible to calculate the wall shear stress $\sigma$ from the difference between the first hole pressure $P_2$ and the second hole pressure $P_3$, measured by the second hole transducer 106b. The wall shear stress $\sigma$ is calculated by using the same formula discussed in connection with FIGS. 5–7.

FIG. 15 illustrates another modified measuring device 112 for determining the hole pressure $P^*$, as well as the wall shear stress $\sigma$. The measuring device 112 of FIG. 15 differs from the device 100 of FIG. 14, in that only the first hole transducer 108a is used, the second hole transducer 106b being omitted. The measuring device 112 of FIG. 15 employs a dual flush pressure transducer 114 for making two flush pressure measurements at different points spaced along the passage or slit 104. Thus, the flush pressure transducer 114 is the same as the flush pressure transducer 20 of FIG. 1, except that the diaphragm foil or means 22 of the transducer 114 provides two diaphragms 28, extending across and closing two separate openings 30 in the body 24. The diaphragms 28 are provided with two separate pressure sensors 34.

With the measuring device 112 of FIG. 15, the hole pressure $P^*$ is the difference between the first flush pressure $P_1$, measured by the first transducer element of the transducer 114, and the hole-measured pressure $P_2$, measured by the hole transducer 106a. The wall shear stress $\sigma$ can be calculated from the difference between the first flush pressure $P_1$ and the second flush pressure $P_3$, measured by the second flush transducer unit of the transducer 114.

In the various embodiments of the present invention, the various pressure transducers can be used in different ways in order to furnish the hole pressure $P^*$ and the wall shear stress $\sigma$, which are the qualities of interest. For example, the transducers can all be direct reading, in which case the differences between the individual pressure readings are obtained by computation. As an alternative, the differences between the direct readings can be obtained by electronic means. A further alternative is to use a null method, in which a counterbalancing fluid pressure is applied to at least two transducers, so as to produce a null in one of the transducers, so that the other transducer will indicate the difference between the pressures of the test fluid on the transducers.

For example, in the measuring device 60 of FIGS. 5–7, the variable pressure source 46 is connected to both transducer elements 66a and b, so that the counterbalancing fluid pressure is applies to the inner sides of both diaphragms 28. The variable pressure source 46 may be adapted to supply air or some other fluid under pressure. The pressure of the variable pressure source 46 is adjusted so as to produce a zero pressure reading or null from the second transducer 66b. This means that the counterbalancing fluid pressure is keeping the second diaphragm 28 nominally flat, in opposition to the pressure produced by the test liquid in the slit or passsage 62. The same counterbalancing pressure is applied to the inner side of the diaphragm 28 of the first transducer 66a. Thus, the pressure reading produced by the first transducer 66a indicates the difference between the pressures $P_1$ and $P_2$ at the first and second transducers 66a and b. When the test liquid is flowing along the passage or slit 62, past the first transducer 66a and then past the second transducer 66b, the pressure $P_1$ at the first transducer is appreciably greater than the pressure $P_2$ at the second transducer 66b, due to the pressure drop along the passage 62 in the direction of flow.

The null method may be applied in exactly the same way to the double pressure transducer 72 of FIGS. 8 and 9.

In the triple pressure transducers of FIGS. 10 and 12, the null method may also be employed. For example, the same variable pressure source 46 may be connected to all three pressure transducers and may be adjusted to produce a null in the third pressure transducer. The pressure reading of the second transducer will then be the difference between the second and third pressures $P_2$ and $P_3$. The reading produced by the first transducer will be the difference between the first and third pressures $P_1$ and $P_3$. The difference between the first and second pressures $P_1$ and $P_2$ can be determined electronically or by computation. If desired, the difference between the first and second pressures can be determined by readjusting the variable pressure source 46 so as to produce a null in the second pressure transducer, in which case the pressure reading produced by the first transducer will be the difference between the first and second pressures $P_1$ and $P_2$.

The null method can also be applied to the triple transducers of FIGS. 14 and 15, to determine both the hole pressure $P^*$ and the wall shear stress $\sigma$. Each of the triple transducers of FIGS. 14 and 15 is adapted to measure three pressures $P_1$, $P_2$ and $P_3$. In each case, $P_1$ is a flush pressure, while $P_2$ is a holemeasured pressure. The difference between $P_1$ and $P_2$, constituting the hole pressure $P^*$, can be determined by connecting the same variable pressure source 46 to the first and second transducers, and by adjusting the pressure source to produce a null in the second or hole transducer. The pressure reading of the first transducer is then the hole pressure $P^*$. The difference between the second and third pressures $P_2$ and $P_3$, both of which are hole measured, can be determined by connecting the same variable pressure source 46 to the second and third transducers and by adjusting the source pressure to produce a null in the third transducer. The pressure reading of the second transducer is then the difference between the second and third pressures $P_2$ and $P_3$. This difference can be employed to calculate the wall shear stress $\sigma$.

In the measuring device 112 of FIG. 15, the difference between the first and second pressures $P_1$ and $P_2$ is again the hole pressure $P^*$ and is determined by the null method in exactly the same manner as described in connection with FIG. 14. In the device 112 of FIG. 15, the first and third transducers are flushmounted. The difference between the first and third pressures $P_1$ and $P_3$ can be determined by connecting the same variable pressure source to both transducers and by adjusting the source pressure to produce a null in the third transducer. The pressure reading of the first transducer then indicates the difference between the first and third pressures $P_1$ and $P_3$. Such difference can be used to compute the wall shear stress $\sigma$. This null technique is well known to give an increased accuracy and an increased range for the pressure difference measuring system.

Figure 17:
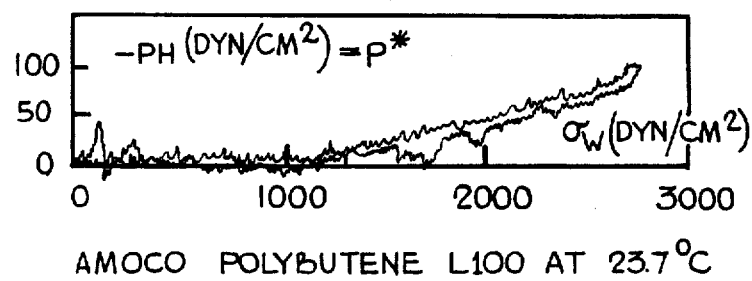
FIG. 17 is a graph representing experimental measurements of hole pressure in relation to shear stress in a flowing nonnewtonian fluid.

FIGS. 16 and 17 are graphs which reproduce actual recordings taken with an experimental pressure measuring device of the type shown in FIG. 14, using the null technique. In FIG. 16, the shear rate is plotted against the shear stress. In FIG. 17, the hole pressure P* is plotted against the wall shear stress $\sigma_w$. FIG. 17 comprises two plots of two different experimental samples of polybutene. Information of this kind as to the hole pressure is valuable because such information can indicate the physical characteristics of test liquids, particularly non-newtonian liquids. Thus, for example, the hole pressure can indicate the degree of polymerization of a resinous plastic material.

FIG. 18 is a plot of viscosity measurements against shear rate, representing experimental measurements made with the apparatus of the present invention and by other known means. From the plotted data, it will be seen that the results obtained with the apparatus of the present invention agree with the results obtained by other known means.

The illustrated embodiments of the present invention utilize variable capacitance means for measuring the diaphragm deflections caused by pressure changes in the test liquid or fluid. It is well known that such capacitance means afford a particularly sensitive and stable means for pressure measurement, when the pressures are not too high. However, it will be understood by those skilled in the art that other means can also be employed with the stepless transducers of the present invention. For example, it is possible to measure changes in inductance caused by movement of the foil diaphragm or a suitable object attached to the foil diaphragm and forming the core of a magnetic device. It is also possible to use a thicker foil diaphragm, especially for high pressures, and to attach a resistance strain gauge to the foil diaphragm, on the side thereof which is remote from the test liquid. The use of a strain gauge is also well adapted for the embodiment of FIG. 4, in which the diaphragm is formed integrally with the supporting body or block. In any case, the flush pressure transducer of the present invention provides a diaphragm means which is stepless, smooth and continuous and is adapted to form one complete die wall of the entire apparatus, in order to avoid a step which would be introduced by incorporating a separate transducer.

The absence of any step makes it possible to use a passage or slit which has a small height h and a small width w, so as to give improved temperature uniformity in the test liquid. This construction also makes it possible to use smaller quantities of the test liquid, so that the apparatus is easy to fill and easy to clean. The present invention also makes it easy to measure the temperature of the test liquid without disturbing the flow of the liquid. The stepless pressure transducer of the present invention is free from any gap which might cause leakage of the test liquid. The construction of the present invention makes it easy to assemble and disassemble the pressure measuring device. The stretched foil diaphragm provides a very stable zero calibration. The present invention makes it possible to employ small values of the slit height h, with the result that it is possible to make measurements at very high shear rates.

I claim:

1. A flush pressure transducer, comprising
   diaphragm means having a substantially flat surface,
   a body backing up and supporting said diaphragm means,
   said body having an opening therein,
   said diaphragm means covering said opening and affording a flexible resilient diaphragm across said opening,
   sensor means operable by said diaphragm for sensing any deflection of said diaphragm due to any pressure differential between the opposite sides of said diaphragm,
   said sensor means including a first capacitor electrode spaced from said diaphragm,
   said diaphragm including a second capacitor electrode, said first and second capacitor electrodes affording a variable capacitance which is variable by deflection of said diaphragm,
   and fluid pressure applying means for applying fluid pressure to said diaphragm within said opening to counterbalance an applied pressure on the opposite side of said diaphragm.

2. A flush pressure transducer, comprising
   diaphragm means having a substantially flat surface,
   a body backing up and supporting said diaphragm means,
   said body having an opening therein,
   said diaphragm means covering said opening and affording a flexible resilient diaphragm across said opening,
   sensor means operable by said diaphragm for sensing any deflection of said diaphragm due to any pressure differential between the opposite sides of said diaphragm,
   and pressure supplying means for supplying fluid pressure to said diaphragm within said opening for counterbalancing an applied pressure on the opposite side of said diaphragm.

3. A flush pressure transducer, comprising
   diaphragm means having a substantially flat surface,
   a body backing up and supporting said diaphragm means,
   said body having an opening therein,
   said diaphragm means covering said opening and affording a flexible resilient diaphragm across said opening,
   sensor means operable by said diaphragm for sensing any deflection of said diaphragm due to any pressure differential between the opposite sides of said diaphragm,
   said body including a second opening behind said diaphragm means,
   and a temperature sensor in said second opening and adjacent said diaphragm means for measuring the temperature thereof.

4. A flush pressure transducer, comprising
   diaphragm means having a substantially flat surface,
   a body backing up and supporting said diaphragm means,
   said body having an opening therein,
   said diaphragm means covering said opening and affording a flexible resilient diaphragm across said opening,
   sensor means operable by said diaphragm for sensing any deflection of said diaphragm due to any pressure differential between the opposite sides of said diaphragm,
   said diaphragm means comprising a substantially flat sheet mounted against said body, said body having a second opening therein behind said sheet, and a temperature sensor in said second opening and adjacent said sheet for measuring the temperature thereof.

5. A flush pressure transducer, comprising diaphragm means having a substantially flat surface, a body backing up and supporting said diaphragm means, said body having an opening therein, said diaphragm means covering said opening and affording a flexible resilient diaphragm across said opening, sensor means operable by said diaphragm for sensing any deflection of said diaphragm due to any pressure differential between the opposite sides of said diaphragm, said body including a second opening, and a temperature transducer in said second opening and adjacent said diaphragm means for measuring the temperature thereof, said diaphragm means being integral with said body and extending across said first mentioned opening and said second opening.

6. A pressure measuring device for measuring the pressure of a flowing fluid, said device comprising passage means forming a passage along which the fluid may flow, said passage means including substantially flat diaphragm means forming substantially one complete wall of said passage, a body backing up and supporting said diaphragm means, said body having an opening behind said diaphragm means, said diaphragm means covering said opening and affording a flexible resilient diaphragm extending across said opening, and sensor means for sensing any deflection of said diaphragm due to any fluid pressure in said passage, said diaphragm means affording a substantially flat continuous wall surface along said passage.

7. A pressure measuring device according to claim 6, in which said diaphragm means comprises a substantially flat sheet mounted against said body and extending across said opening, said body having a substantially flat wall engaging and supporting said sheet.

8. A pressure measuring device according to claim 7, including bonding means between said sheet and said body for bonding said sheet to said body.

9. A pressure measuring device according to claim 7, including a second opening in said body behind said sheet, and a temperature sensor in said second opening and adjacent said sheet for sensing the temperature of the fluid in the passage.

10. A pressure measuring device according to claim 6, in which said diaphragm means is integral with said body.

11. A pressure measuring device according to claim 10, including a second opening in said body behind said diaphragm means, and a temperature sensor in said second opening for sensing the temperature of the fluid in the passsage.

12. A flush pressure transducer, comprising diaphragm means having a substantially flat surface, a body backing up and supporting said diaphragm means, said body having an opening therein, said diaphragm means covering said opening and affording a flexible resilient diaphragm across said opening, sensor means operable by said diaphragm for sensing any deflection of said diaphragm due to any pressure differential between the opposite sides of said diaphragm, said body including a second opening, a temperature transducer in said second opening and adjacent said diaphragm means for measuring the temperature thereof, said diaphragm means being integral with said body and extending across said first mentioned opening and said second opening, said body including at least one additional opening behind said diaphragm means, said diaphragm means covering said additional opening and affording an additional flexible resilient diaphragm extending across said additional opening, and additional sensor means for sensing any deflection of said additional diaphragm due to any fluid pressure thereon.

13. A pressure measuring device according to claim 12, in which said body includes at least one additional opening, said sheet affording an additional flexible resilient diaphragm extending across said additional opening, and additional sensor means for sensing any deflection of said additional diaphragm due to any fluid pressure thereon.

14. A pressure measuring device according to claim 13, in which said additional diaphragm is spaced along said passage from said first mentioned diaphragm so that said diaphragms will measure pressures at spaced points along said passage.

* * * * *